(12) United States Patent
Owen et al.

(10) Patent No.: US 9,986,563 B2
(45) Date of Patent: May 29, 2018

(54) DYNAMIC ALLOCATION OF NETWORK BANDWIDTH

(71) Applicant: Vicidiem Holdings, LLC, Provo, UT (US)

(72) Inventors: Aaron M. Owen, Salt Lake City, UT (US); Craig B. Hutchinson, Salt Lake City, UT (US)

(73) Assignee: Vicidiem Holdings, LLC, Provo, UT (US)

( * ) Notice: Subject to any disclaimer, the term of this patent is extended or adjusted under 35 U.S.C. 154(b) by 126 days.

(21) Appl. No.: 14/632,964

(22) Filed: Feb. 26, 2015

(65) Prior Publication Data

US 2015/0282180 A1    Oct. 1, 2015

Related U.S. Application Data

(60) Provisional application No. 61/946,519, filed on Feb. 28, 2014.

(51) Int. Cl.
| | |
|---|---|
| *H04W 72/04* | (2009.01) |
| *H04L 12/46* | (2006.01) |
| *H04W 72/08* | (2009.01) |
| *H04L 12/24* | (2006.01) |
| *H04L 12/915* | (2013.01) |

(Continued)

(52) U.S. Cl.
CPC ..... *H04W 72/0453* (2013.01); *H04L 12/4641* (2013.01); *H04L 41/0896* (2013.01); *H04L 41/5025* (2013.01); *H04L 47/762* (2013.01); *H04L 47/785* (2013.01); *H04W 72/085* (2013.01); *H04L 41/0893* (2013.01); *H04L 43/0894* (2013.01); *H04L 43/16* (2013.01)

(58) Field of Classification Search
CPC ..... H04L 12/24; H04L 12/46; H04L 12/4641; H04W 72/085; H04W 72/0453
See application file for complete search history.

(56) References Cited

U.S. PATENT DOCUMENTS 7,095,716 B1 * 8/2006 Ke ............... H04L 63/0272
370/230
2003/0235208 A1  12/2003 Sahinoglu
(Continued)

OTHER PUBLICATIONS

International Search Report, PCT patent application PCT/US2015/018127, (WIPO) (dated May 26, 2015), 3 pages.
(Continued)

*Primary Examiner* — Gbemileke J Onamuti
(74) *Attorney, Agent, or Firm* — Kirton McConkie; Brian Tucker

(57) ABSTRACT

A bandwidth reallocation circuit can monitor data traffic to and/or from logical network segments (LNSs) of a segmented network. As the data traffic rate to and/or from individual LNSs changes, the bandwidth reallocation circuit can dynamically reallocate the total bandwidth among the LNSs to meet changing bandwidth needs. Thus, as some of the LNSs become busy with data traffic, network bandwidth can be temporarily borrowed for less active LNSs. This can result in more efficient use of the network bandwidth capacity of the network than has been achieved in the prior art, which can significantly increase the speed at which data can be uploaded and/or downloaded to the individual LNSs.

20 Claims, 9 Drawing Sheets

(51) Int. Cl.
*H04L 12/923* (2013.01)
*H04L 12/26* (2006.01)

(56) References Cited

U.S. PATENT DOCUMENTS

| | | | |
|---|---|---|---|
| 2007/0206501 A1* | 9/2007 | Alesi | H04L 47/10 370/235 |
| 2008/0310301 A1 | 12/2008 | Wade et al. | |
| 2009/0141731 A1* | 6/2009 | Bitar | H04L 12/5695 370/412 |
| 2009/0144820 A1 | 6/2009 | Kurapati et al. | |
| 2010/0254406 A1* | 10/2010 | Youn | H04L 12/4675 370/468 |
| 2011/0270987 A1* | 11/2011 | Schlansker | H04L 47/522 709/226 |
| 2011/0292793 A1* | 12/2011 | Kanada | H04L 1/1858 370/230 |
| 2012/0127857 A1* | 5/2012 | Sundar | H04L 45/00 370/230.1 |
| 2012/0166626 A1 | 6/2012 | Rai et al. | |
| 2013/0336229 A1 | 12/2013 | Kakadia et al. | |
| 2016/0234039 A1* | 8/2016 | Ng | H04L 47/41 |

OTHER PUBLICATIONS

Written Opinion of the International Searching Authority, PCT patent application PCT/US2015/018127, (WIPO) (dated May 26, 2015), 6 pages.

\* cited by examiner

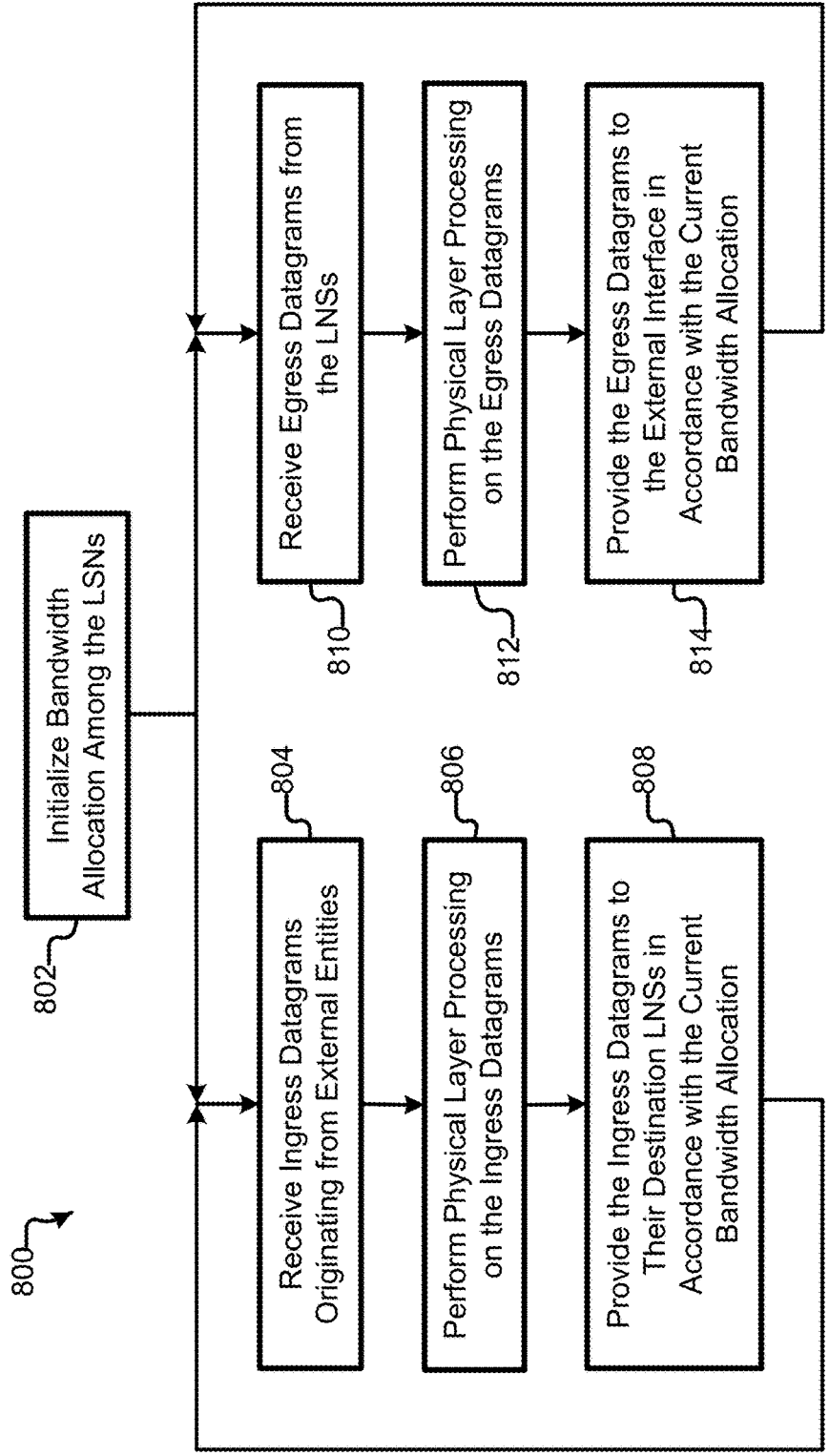

DYNAMIC ALLOCATION OF NETWORK BANDWIDTH

CROSS REFERENCE TO RELATED APPLICATION(S)

This application is a non-provisional (and thus claims the benefit) of U.S. provisional patent application Ser. No. 61/946,519 (filed Feb. 28, 2014), which is incorporated by reference herein in its entirety.

BACKGROUND

Networks comprising computing devices, communications devices, entertainment devices, and the like are ubiquitous. A network typically has a fixed bandwidth capacity, which is divided among the users of the network but often not utilized efficiently. For example, a user's bandwidth allocation is typically fixed, and the user cannot even temporarily utilize more than his or her bandwidth allocation regardless of the temporary availability of bandwidth not currently being used by other users of the network. Some embodiments of inventions in this disclosure can dynamically allocate the limited bandwidth of a network among users of the network in accordance with changing bandwidth demands of the users. Some embodiments of the inventions can thus more efficiently utilize the bandwidth of a network.

SUMMARY

In some embodiments, a process of dynamically allocating a bandwidth capacity of a network among logical network segments (LNSs) of the network can include determining for each of the LNSs a new traffic rate of datagrams passing through a common interface to or from the LNS. The process can also include reallocating the bandwidth capacity among the LNSs upon detecting a change criteria with respect to one of the new traffic rates.

In some embodiments, a system for dynamically allocating bandwidth can include a network divided into LNSs, a common interface between each of the LNSs and an entity external to the network, and a bandwidth reallocation circuit. The bandwidth reallocation circuit can be configured to monitor traffic rates of datagrams passing through the common interface to or from each of the LNSs and reallocate a bandwidth capacity of the network among the LNSs each time a change criteria is detected in one of the traffic rates.

BRIEF DESCRIPTION OF THE DRAWINGS

FIG. 8 is a process illustrating an example of operation of the network of FIG. 6.

DETAILED DESCRIPTION OF EMBODIMENTS

Figure 1:
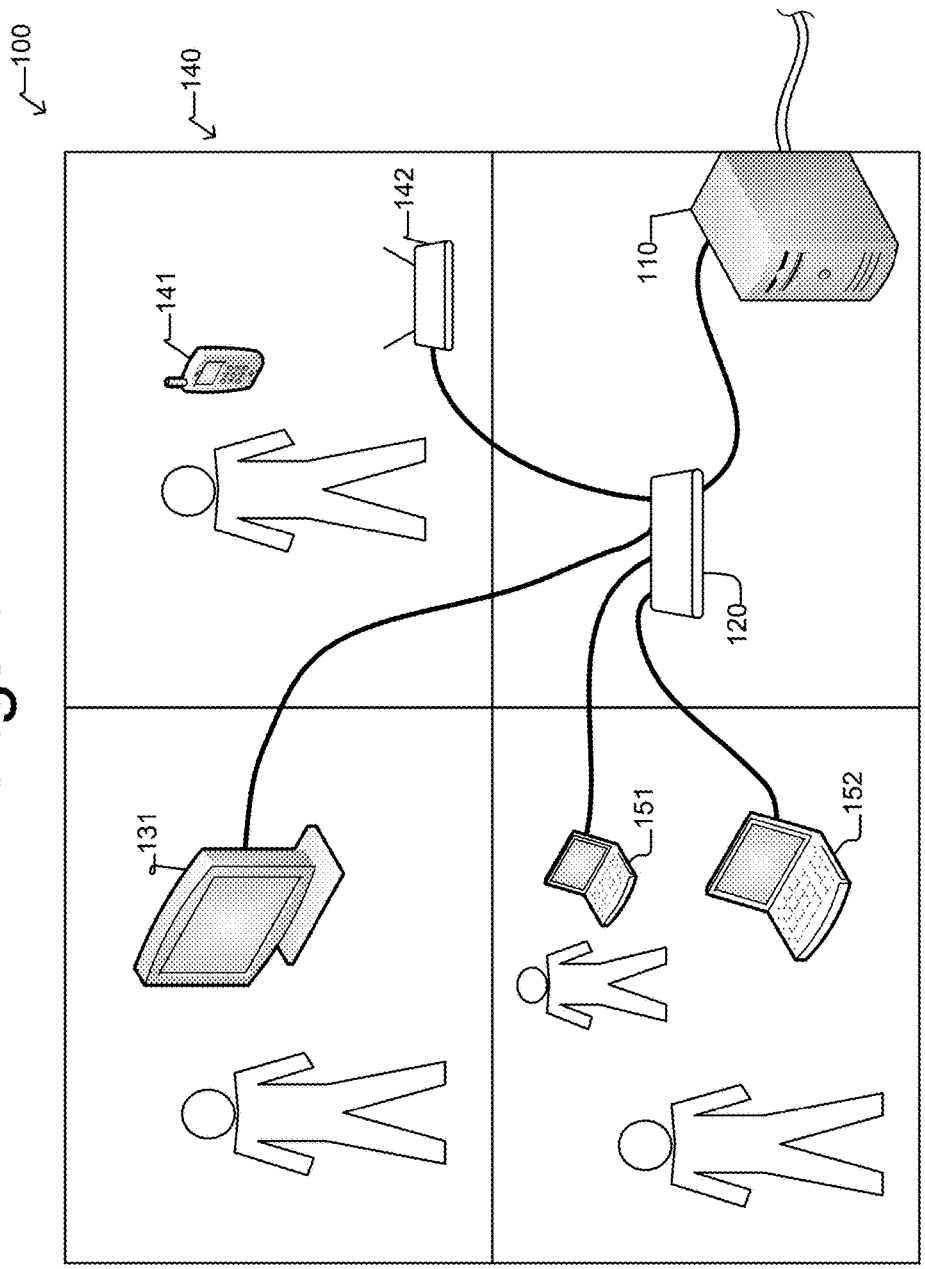
FIG. 1 is a schematic diagram of a system for providing metro Ethernet service to a plurality of users.

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent. The term "ones" means more than one. The term "disposed" encompasses within its meaning "located."

As used herein, "circuit" encompasses within its meaning an electronics module comprising one or a combination of the following configured to perform one or more processes, steps of a process, functions, or the like: (1) a digital memory device for storing non-transitory machine executable instructions (e.g., microcode, firmware, software, or the like) and a digital processing device (e.g., a microprocessor, microcontroller, computer, or the like) for operating in accordance with the machine executable instructions stored in the digital memory device to perform the one or more processes, steps of a process, and/or functions; (2) hardwired digital logic circuitry configured to perform the one or more processes, steps of a process, and/or functions; or (3) a combination of the foregoing configured to perform the one or more processes, steps of a process, and/or functions. A "circuit" can also include analog electronic components.

As used herein, a "network" can be a communications, computing, entertainment, or similar network. Such a "network" can comprise a grouping of connected communications, computing, entertainment, or similar devices sharing a same network identifier that uniquely identifies the network from all other such networks with which the network can be connected or communicate, for example, via the Internet or a similar connection of networks.

A router may couple a plurality of users to an external network and manage user traffic. For example, a metropolitan-area Ethernet ("metro Ethernet") network router may couple a large number of users to the Internet and may attempt to fairly distribute bandwidth among the large number of users. Unfortunately, traditional traffic shaping algorithms, particularly those that rely on network layer (layer 3) or higher information, may be computationally inefficient for the large number of users on a metro Ethernet network. For example, such traditional traffic shaping algorithms may lack the ability to dynamically allocate bandwidth among multiple segments of a network. Additionally, traditional traffic shaping algorithms may be applied to a network layer or higher layer (e.g., layer 3 or higher), so a user with numerous devices or who has opened multiple network layer (e.g., transmission control protocol (TCP) or user datagram protocol (UDP)) sessions may receive more bandwidth than is fair. Alternatively, a hard cap may be applied to each user to ensure that no user receives an unfair amount of bandwidth. However, the hard cap may not take advantage of the full bandwidth available to the router, and the excess capacity may be left unused. Accordingly, there is a need for a system that fairly allocates bandwidth among a plurality of users while maximizing usage of the available bandwidth capacity.

A system for fairly allocating bandwidth among users may include a communication interface. The communication interface may be communicatively coupled to an external network, such as the internet. The communication interface may also, or instead, be communicatively coupled to a plurality of users on one or more internal networks. The communication interface may include a plurality of physical connections to the external and one or more internal networks. The plurality of physical connections may be distinct and/or separate from one another and/or may be configured as a plurality of distinct and/or separate units. For example, the communication interface may include one or more network interface controllers ("NICs") for coupling to the one or more internal networks and may include an external network interface, such as a fiber interface, for coupling to the external network. Each NIC and the external network interface may be distinct and/or separate units from one another and may be coupled together by the system. In an embodiment, the communication interface may include one or more switches, which may be distinct and separate from a router included in the system. For example, the system may be configured as a router on a stick. The system may provide the full functionality of an enterprise grade edge router. For example, the system may be configured to perform the Border Gateway Protocol ("BGP"), the Open Shortest Path First ("OSPF") protocol, Network Address Translation ("NAT"), and/or the like.

The communication interface may segregate the plurality of users on one or more internal networks into a plurality of virtual link layer domains. The plurality of virtual link layer domains may be distributed among one or more different physical media (e.g., a physical medium may share multiple virtual link layer domains). In an embodiment, the plurality of virtual link layer domains may be a plurality of virtual local area networks ("VLANs"), which, for example, may be identified by tags according to IEEE 802.1ad or a similar standard. The plurality of virtual link layers may disguise from the users that a physical medium is shared. In an embodiment, each user may be associated with its own virtual link layer domain. Each user may be a customer and/or an account with a service provider (e.g., the system owner), and a single user may include multiple people and/or devices.

A first data packet scheduler may be configured to fairly allocate bandwidth among the plurality of virtual link layer domains. For example, the connection to the external network may have a maximum physical rate limit and/or a rate limit determined by a router coupled to the system by the external connection. The first data packet scheduler may determine how to fairly allocate the bandwidth by ensuring that each virtual link layer domain receives at least a predetermined minimum amount of bandwidth (e.g., a contractually guaranteed minimum bandwidth) and by providing additional bandwidth when it is available. In an embodiment, the first data packet scheduler may be configured to attempt to maximize use of the total bandwidth available on the connection to the external network. For example, the first data packet scheduler may provide the total bandwidth available on the connection to the external network to an active virtual link layer domain when no other traffic is present on the one or more internal networks.

To allocate bandwidth, the first data packet scheduler may measure the bandwidth used by each virtual link layer domain. The first data packet scheduler may also determine an amount of bandwidth to allocate to each virtual link layer domain. The first data packet scheduler may schedule data packets based on the determined amount of bandwidth to be allocated and/or the amount of bandwidth used. The amount of bandwidth to allocate may be determined in substantially real time based on current bandwidth usage. Substantially real time may include adjustments in allocation taking no more than 0.1, 0.2, 0.5, 1, 2, 5, etc. seconds from when traffic changes. Exemplary algorithms for measuring and/or allocating bandwidth may include Hierarchical Fair Service Curve, Stochastic Fair Queuing, Class-Based Queuing, Token Bucket, Hierarchical Token Bucket, and/or the like. The algorithms may be implemented in a higher level programming language that runs on an operating system, may be implemented in a lower level programming language as a device driver, may be implemented in hardware, and/or the like.

In an embodiment, the first data packet scheduler may include a traffic shaping program configured to allocate bandwidth based on network layer addresses (e.g., Internet Protocol ("IP") addresses) and/or higher layer addresses. The system may include one or more intermediate queuing devices ("IMQs") configured to encapsulate the plurality of virtual link layer domains. The one or more IMQs may provide information about the virtual link layer domains for received packets to the traffic shaping program. For example, the IMQs may provide the information about the virtual link layer domains to the traffic shaping program; the IMQs may make the information about the virtual link layer domains available to an operating system from which the traffic shaping program can retrieve the information; and/or the like. The traffic shaping program may use the information from the one or more IMQs to measure bandwidth use by each virtual link layer domain and to allocate bandwidth and schedule packets accordingly. In an embodiment, the first data packet scheduler may examine a virtual link layer domain identifier (e.g., one or more IEEE 802.1ad tags) to measure the amount of bandwidth being used by each virtual link layer domain. In alternative embodiments, a specialized traffic shaping program for virtual link layer domains may be configured in software and/or hardware.

Despite fair bandwidth allocation among the plurality of virtual link layer domains, end devices/applications may still experience poor performance due to misuse of the available bandwidth (e.g., a User Datagram Protocol ("UDP") based worm or bittorrent transfer may dominate bandwidth usage to the detriment of other devices/application in the same virtual link layer domain). A second data packet scheduler may be configured to allocate bandwidth within one or more of the virtual link layer domains. In some embodiments, all of the virtual link layer domains may be managed by the second data packet scheduler.

The second data packet scheduler may allocate a portion of bandwidth to each of a plurality of devices, applications, and/or data types on each virtual link layer domain. The portion of bandwidth allocated to each device, application, and/or data type by the second data packet scheduler may be no greater than the bandwidth allocated by the first data packet scheduler to the particular virtual link layer domain on which the devices, applications, and/or data types reside. The device, application, and/or data type may be identified by the second data packet scheduler using a network layer address (e.g., an IP address), a network interface address (e.g., a media access control ("MAC") address), a transport layer address (e.g., a port number), a higher layer identifier, information gathered via deep packet inspection, and/or the like. The second data packet scheduler may determine the portion of bandwidth to allocate in substantially real time (e.g., in no more than 0.1, 0.2, 0.5, 1, 2, 5, etc. seconds). In an embodiment, voice and real-time video may be highly prioritized and UDP and peer-to-peer traffic may receive a lowest priority.

The system may include a computer system. Embodiments may include various steps, which may be embodied in machine-executable instructions to be executed by a computer system. A computer system includes one or more general-purpose or special-purpose computers (or other electronic devices). Alternatively, the computer system may include hardware components that include specific logic for performing the steps or include a combination of hardware, software, and/or firmware. Without limitation, a computer system may include a workstation, laptop computer, disconnectable mobile computer, server, mainframe, cluster, so-called "network computer" or "thin client," tablet, smartphone, personal digital assistant or other hand-held computing device, "smart" consumer electronics device or appliance, or a combination thereof. A server may include a physical server, a server cluster, a distributed server, a virtual server, a cloud server, a computer providing resources to one or more clients, a combination of one or more of the aforementioned, and/or the like. Some or all of the functions, steps, and/or operations discussed herein may be performed by one or more clients rather than a server. Those of skill in the art will realize many possible divisions of operations between servers and clients.

Each computer system includes at least a processor and a memory; computer systems may also include various input devices and/or output devices. The processor may include one or more general-purpose central processing units ("CPUs"), graphic processing units ("GPUs"), or Digital Signal Processors ("DSPs"), such as Intel®, AMD®, Nvidia®, ATI®, TI®, or other "off-the-shelf" microprocessors. The processor may include a special-purpose processing device, such as ASIC, PAL, PLA, PLD, FPGA, or other customized or programmable device. The memory may include static RAM, dynamic RAM, flash memory, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computers may be capable of using a floppy drive, tape drive, optical drive, magneto-optical drive, memory card reader, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Embodiments may also be provided as a computer program product, including a non-transitory machine-readable storage medium having stored thereon instructions that may be used to program a computer (or other electronic device) to perform processes described herein. The non-transitory machine-readable storage medium may include, but is not limited to, hard drives, floppy diskettes, optical disks, CD-ROMs, DVD-ROMs, ROMs, RAMs, EPROMs, EEPROMs, magnetic or optical cards, tapes, solid-state memory devices, or other types of media/machine-readable media suitable for storing electronic instructions.

Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies. One suitable network includes a server and several clients; other suitable networks may contain other combinations of servers, clients, and/or peer-to-peer nodes, and a given computer may function both as a client and as a server. Each network includes at least two computer systems, such as servers and/or clients.

The network may include communications or networking software, such as the software available from Novell, Microsoft, Artisoft, and other software providers, and may operate using TCP/IP, SPX, IPX, and other protocols over twisted pair, coaxial or optical fiber cables, telephone lines, satellites, microwave relays, modulated AC power lines, physical media transfer, and/or other data transmission "wires" or wireless networks known to those of skill in the art. The network may encompass smaller networks and/or be connectable to other networks through a gateway or similar mechanism.

Suitable software to assist in implementing the invention is readily provided by those of skill in the pertinent art(s) using the teachings presented here and programming languages and tools, such as Java, Pascal, C++, C, PHP, JavaScript, Python, C#, Perl, SQL, Ruby, Shell, Visual Basic, Assembly, Action Script, Objective C, Lisp, Scala, Tcl Haskell, Scheme, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, comprise one or more physical or logical blocks of computer instructions, which may be organized as a routine, a program, a script, an object, a component, a data structure, etc. that performs one or more tasks or implements particular abstract data types.

In certain embodiments, a particular software module may comprise disparate instructions stored in different locations of a memory device, different memory devices, or different computers, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that may be used according to the present invention is already available, such as general-purpose computers, computer programming tools and techniques, computer networks and networking technologies, and digital storage media.

FIG. 1 is a schematic diagram of a system 100 for providing metro Ethernet service to a plurality of users. The system 100 may include a router 110, which may be communicatively coupled to an external network by a fiber optic cable 105. The system 100 may also include a switch 120, which may be communicatively coupled to the router 110. The switch 120 may be configured to communicatively couple a plurality of users 130, 140, 150 to the router 110. The plurality of users 130, 140, 150 may be coupled to the switch 120 and router 110 by Ethernet. Although three users 130, 140, 150 and a single switch 120 are shown in the illustrated embodiment, many more users (e.g., over 100; over 1,000; over 10,000; etc. users) may be coupled to the router 110 in some embodiments by a plurality of switches.

The users 130, 140, 150 may couple numerous types of devices to the router 110. For example, a first user 130 may couple a smart television 131 to the router 110, a second user 140 may couple a personal electronic device 141 to the router 110 through a personal wireless router 142, and a third user 150 may couple a plurality of computer systems 151, 152 to the router 110. The switch 120 may be configured to segregate each of the plurality of users 130, 140, 150 into their own virtual link layer domain. For example, the switch 120 may add a unique tag for each user 130, 140, 150 to the Ethernet frames received from the users 130, 140, 150. If a user 150 has coupled multiple devices 151, 152 to the switch 120, the switch 120 may assign a same tag to Ethernet frames from both devices 151, 152.

The router 110 may include a first and/or a second data packet scheduler for performing traffic shaping on packets received from the plurality of users 130, 140, 150 and/or received from the external network for delivery to the plurality of users 130, 140, 150. The router 110 may read tags placed on Ethernet frames by the switch 120 and/or may add tags to Ethernet frames used to encapsulate IP packets received from the external network. The router 110 may use the tags to measure the bandwidth being consumed by each user 130, 140, 150. In addition, once the router 110 has determined how much bandwidth to allocate to each user 130, 140, 150, the router 110 may use the tags to determine which packets should be delayed and/or discarded to achieve the desired bandwidth/traffic shaping for each user 130, 140, 150.

Figure 2:
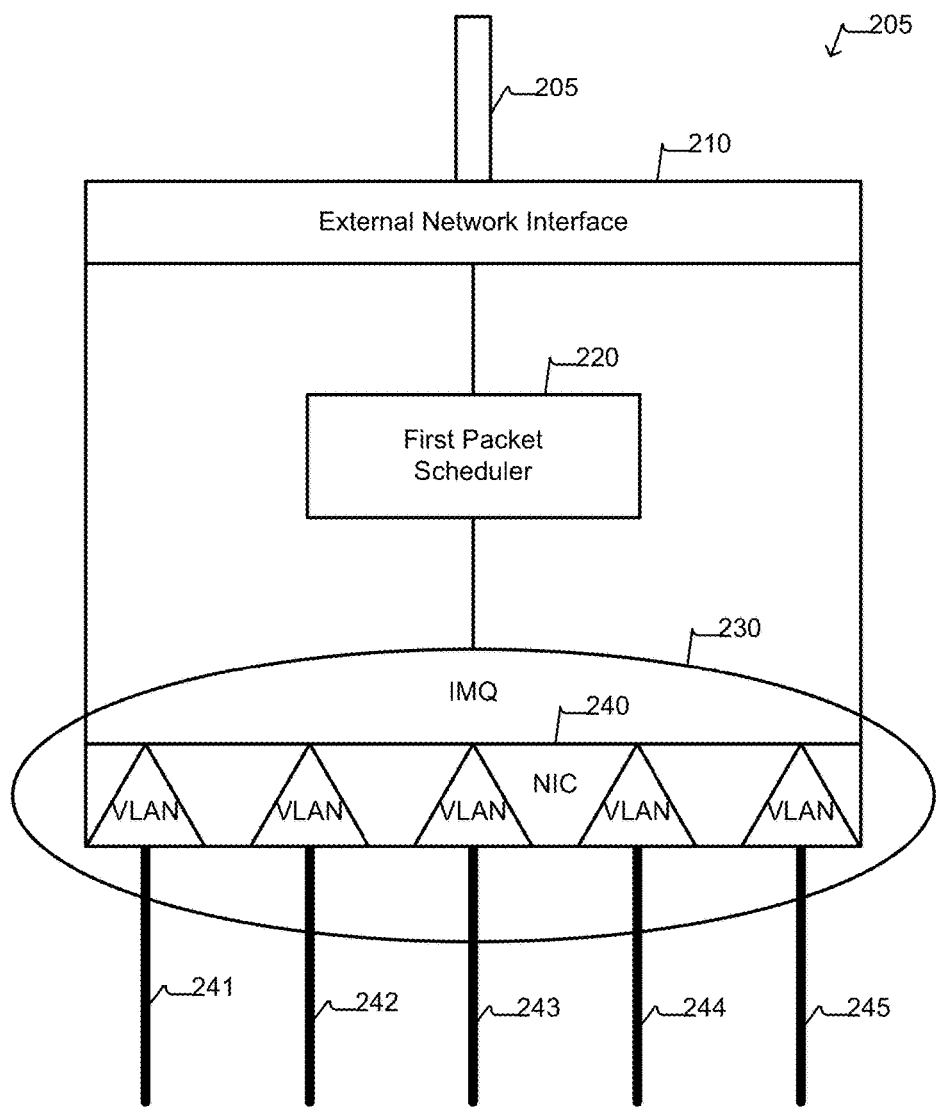
FIG. 2 is a schematic diagram of a system for routing and traffic shaping packets between an external network connection and a plurality of VLANs.

FIG. 2 is a schematic diagram of a system 200 for routing and traffic shaping packets between an external network connection 205 and a plurality of VLANs 241-245. The plurality of VLANs 241-245 may share a common physical interface, such as a NIC 240. For example, the NIC 240 may be coupled to a switch (not shown) by an Ethernet cable (not shown). The NIC 240, and/or the switch, may multiplex traffic for and/or from the VLANs 241-245 onto the Ethernet cable. The VLANs 241-245 may segregate each user into their own virtual network so they cannot interact with each other's packets and they appear to each have their own local area network ("LAN").

An external network interface 210 may deliver packets to and receive packets from the external network connection 205. The external network interface 210 may include hardware for coupling to the external network connection 205 and/or may include software for managing the external network connection 205. The external network interface 210 may be configured to perform one or more routing protocols (e.g., BGP, OSPF, etc.) to determine appropriate routes for outgoing packets. The external network interface 210 may also, or instead, perform NAT on incoming and/or outgoing packets.

The system 200 may include an IMQ 230 and a first packet scheduler 220. The first packet scheduler 220 may be designed to apply traffic shaping to received packets based on layer 3 and/or higher information (e.g., an IP address, a port, and/or the like). The IMQ 230 may encapsulate all activity on the VLANs 241-245 and may provide data link layer information to the first packet scheduler 220 about packets destined for and/or received from the VLANs 241-245. The first data packet scheduler 220 may then use the data link layer information to perform traffic shaping. In an embodiment, the first data packet scheduler 220 may perform class-based queuing, and each VLAN may have a class associated with it. Each class, and therefore each VLAN, may have a guaranteed minimum bandwidth and may be able to borrow additional bandwidth when the user needs it and the additional bandwidth is available.

Figure 3:
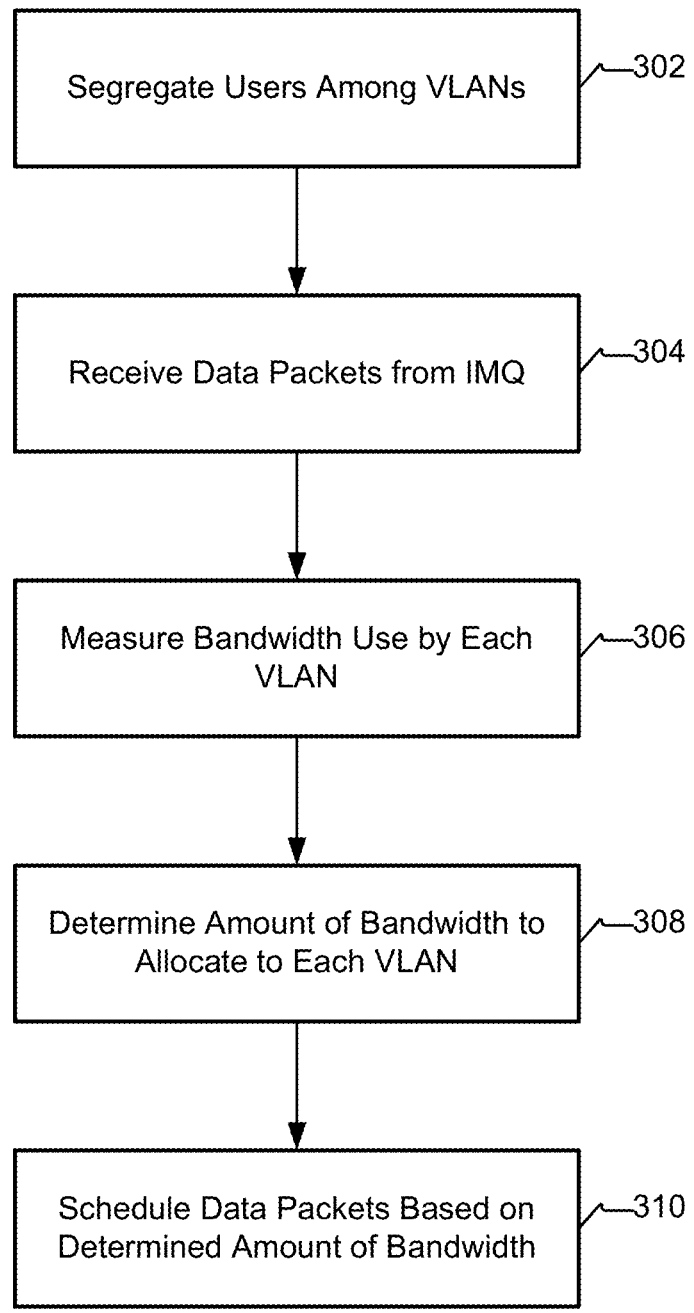
FIG. 3 is a flow diagram of a method for allocating bandwidth to a plurality of users of a metro Ethernet.

FIG. 3 is a flow diagram of a method 300 for allocating bandwidth to a plurality of users of a metro Ethernet. The method 300 may begin by segregating 302 the plurality of user among a plurality of VLANs. In an embodiment, there may be one VLAN per user. A router and/or a switch (e.g., the router 110 and the switch 120) may segregate the users into VLANs by assigning tags (e.g., IEEE 802.1ad tags) to Ethernet frames destined for and/or received from the plurality of users. Each user may be associated with a unique tag that may be used to identify the particular VLAN that is going to carry and/or did carry the Ethernet frame. The tags may prevent unintended users from receiving and/or snooping on frames. Data packets may be received 304 from an IMQ (e.g., the IMQ 230). The IMQ 230 may provide data link layer information for each data packet as well. Based on the data link layer information, the data packets may be filtered into classes associated with each VLAN. For example, there may be a one-to-one ratio between VLANs and classes, and the class assigned to each data packet may be selected based on the unique tag used to identify the VLAN.

The bandwidth use for each class may be measured 306 to determine how much bandwidth each VLAN is using. The bandwidth use may be measured 306 over a predetermined period of time, by comparing the bandwidth to a predetermined rate (e.g., using tokens), and/or the like. Measuring 306 the bandwidth may include determining whether a VLAN is using more or less than its guaranteed minimum bandwidth and/or allocated bandwidth. An amount of bandwidth to allocate to each VLAN may be determined 308 based on the measured bandwidth use. Each VLAN using no more than their guaranteed minimum bandwidth may be allocated the amount of bandwidth being used. In some embodiment, the guaranteed minimum bandwidth may also be a bandwidth limit. If a VLAN is using more than its bandwidth limit, it may be determined whether additional bandwidth can be borrowed by that VLAN. For example, if one or more other VLANs are using less than their guaranteed minimum bandwidth, the VLAN using more than its bandwidth limit may be able to borrow bandwidth from the other VLANs until it is needed by the other VLANs. In an embodiment, a group of VLANs may have a group bandwidth limit, and the VLAN using more than its individual bandwidth limit may be able to borrow bandwidth if the group bandwidth limit has not been reached. If the VLAN is using more than its bandwidth limit and additional bandwidth cannot be borrowed, the VLAN may be allocated its bandwidth limit.

Data packets may be scheduled 310 for delivery based on the measured bandwidth and/or the amount of bandwidth allocated to a VLAN associated with the data packet being scheduled. If a VLAN is using more bandwidth than has been allocated to it, one or more data packets may be delayed and/or dropped. Applications on the VLAN may be configured to reduce their bandwidth use in response to having packets delayed and/or dropped, so the VLAN may change bandwidth use to match the amount allocated. If a VLAN is not using more bandwidth than has been allocated to it, data packets may be scheduled fairly with data packets from the other VLANs. Devices on the VLAN may be configured to increase bandwidth use if additional bandwidth is needed and data packets are not delayed and/or dropped. The bandwidth use may increase until the allocated bandwidth is reached, and data packets start to be delayed and/or dropped. Accordingly, the data packet scheduling 310 may cause each VLAN to use the lesser of the bandwidth use it desires and the allocated bandwidth. Although the measuring 306 bandwidth, determining 308 amount of bandwidth to allocate, and scheduling 310 data packet steps are illustrated as distinct steps, they may be combined in some embodiments. For example, a decision on scheduling 310 a data packet may be configured to inherently determine 308 an amount of bandwidth to allocate.

Figure 4:
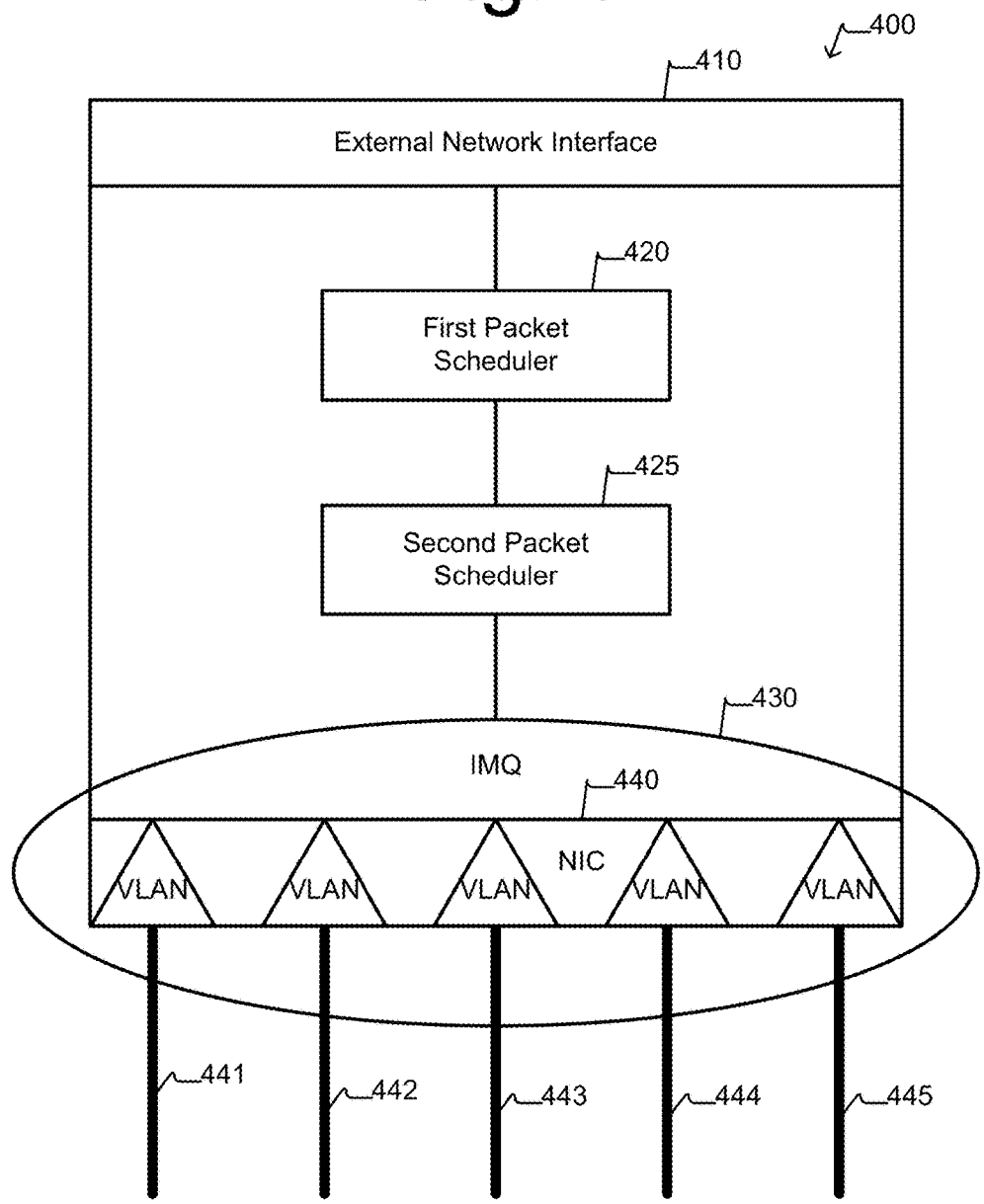
FIG. 4 is a schematic diagram of a system for routing and traffic shaping packets between an external network connection and a plurality of VLANs.

FIG. 4 is a schematic diagram of a system 400 for routing and traffic shaping packets between an external network connection 405 and a plurality of VLANs 441-445. The system 400 may be configured to fairly allocate bandwidth among devices, applications, and/or data types in each VLAN 441-445 in addition to fairly allocating bandwidth among the VLANs 441-445. The system 400 may include an external network interface 410 configured to deliver packets to and receive packets from an external network connection (not shown). The external network interface 410 may include hardware and/or software for coupling to the external network connection and performing any necessary routing protocols (e.g., BGP, OSPF, NAT, etc.) for managing the sending and/or receiving of packets using the external network connection.

The plurality of VLANs 441-445 may share a common physical interface, such as a NIC 440. As with the system 200, the NIC 440 may be coupled to a switch (not shown) by an Ethernet cable (not shown), and the NIC 440, and/or the switch, may multiplex traffic for and/or from the VLANs 441-445 onto the Ethernet cable. The VLANs 441-445 may segregate each user into their own virtual network so they cannot interact with each other's packets and they appear to each have their own LAN. Each VLAN 441-445 may include a plurality of devices, applications, and/or data types thereon. The plurality of devices, applications, and/or data types may compete for the bandwidth on the VLAN 441-445. Accordingly, an application for which the user desires fast responsiveness, such as a web browser, may experience poor performance due to an application requiring less responsiveness saturating the bandwidth.

The system 400 may also include first and second packet schedulers 420, 425. In an embodiment, the first packet scheduler 420 may be configured to schedule packets based on data link layer information (e.g., layer 2 information), and the second packet scheduler 425 may be configured to schedule packets based on network layer and/or higher layer information (e.g., layer 3 or higher information). The first and second packet schedulers 420, 425 are depicted as separate blocks but some or all of the steps performed by the first and second packet schedulers 420, 425 may be done cooperatively (e.g., a step required by both packet schedulers 420, 425 may be done once, and the results may be shared with both packet schedulers). In an embodiment, a single data packet scheduler may perform the functionality of both the first and second packet schedulers 420, 425. For example, a program may evaluate a set of rules to perform the layer 2 and layer 3 scheduling as part of a single operation. A single scheduling decision may be made for each packet based on the evaluation of the set of rules.

The system 400 may include an IMQ 430 to provide necessary information to the first and/or second packet scheduler 420, 425. Similar to the system 200, the IMQ 430 may encapsulate all activity on the VLANs 441-445 and may provide data link layer information to the first packet scheduler 420 and/or the second packet scheduler 425. The data link layer information may indicate which VLAN 441-445 a packet is destined for and/or has been received from. The first packet scheduler 420 may use the data link layer information to perform traffic shaping. The second packet scheduler 425 may use an IP address, port number, MAC address, and/or the data link layer information to perform traffic shaping. Alternatively, or in addition, the second packet scheduler 425 may perform deep packet inspection to determine how to schedule packets.

The second packet scheduler 425 may operate within the constraints determined by the first packet scheduler. For example, devices, applications, and/or data types may not be allocated more bandwidth than the VLAN on which they are located, and the total bandwidth of all devices, applications, and/or data types on a VLAN may not exceed the bandwidth allocated to that VLAN. In an embodiment, the first and second packet schedulers 420, 425 may be configured as a class-based queue with each class corresponding to a VLAN, and each class may include a queuing algorithm for managing bandwidth for devices, applications, and/or data types within the corresponding VLAN. Alternatively, or in addition, fewer than all VLANs may be subject to layer 3 or higher layer traffic shaping (e.g., a user may perform their own traffic shaping on packets associated with the VLAN). In an embodiment, the second packet scheduler 425 may limit bandwidths for different devices, applications, and/or data types. The second packet scheduler 425 may attempt to borrow bandwidth between devices, applications, and/or data types before any attempt is made to borrow from other VLANs. Alternatively, or in addition, the second packet scheduler 425 may prioritize packets based on various constraints (e.g., throughput, delay, packet loss, etc.) and/or priorities. If a device, application, and/or data type desires more bandwidth than it receives from the second packet scheduler 425, the first packet scheduler 420 may determine whether that bandwidth can be borrowed from another VLAN.

Figure 5:
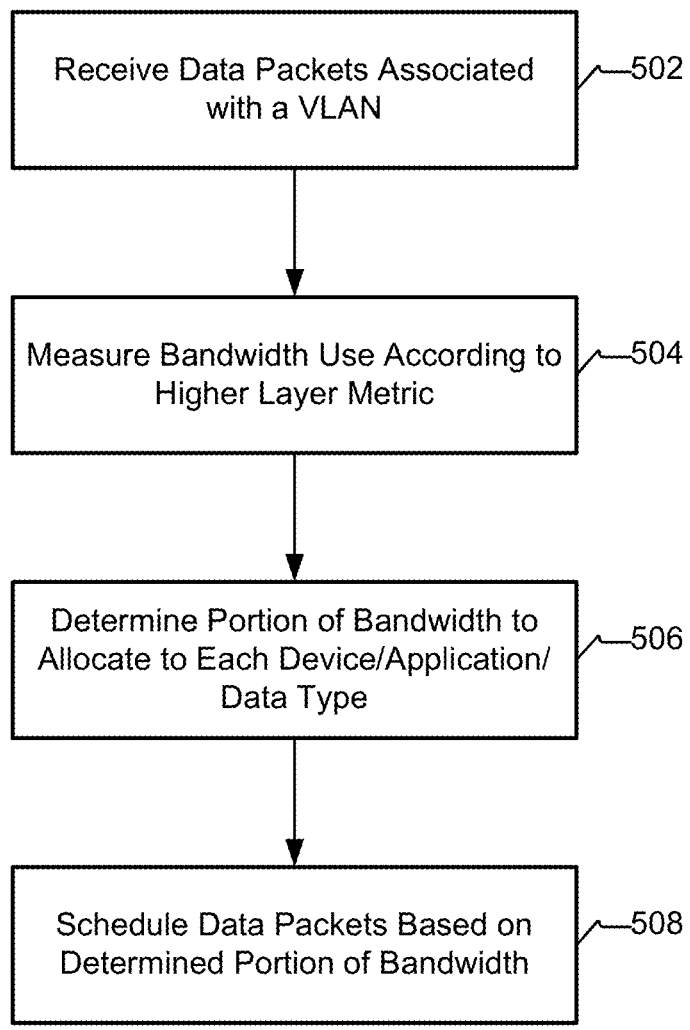
FIG. 5 is a flow diagram of a method for allocating bandwidth to a plurality of users of a metro Ethernet and one or more devices, applications, and/or data types of each user.

FIG. 5 is a flow diagram of a method 500 for allocating bandwidth to a plurality of users of a metro Ethernet and one or more devices, applications, and/or data types of each user. In an embodiment, the method 500 may use information determined from performing the method 300 and/or may be performed concurrently with the method 300. The method 500 may begin by receiving 502 data packets associated with a particular VLAN. The data packets may be destined for devices and/or applications on the particular VLAN and/or received from devices and/or applications on the particular VLAN. A unique tag may be used to determine with which VLAN each data packet is associated. Steps 504-508 of the method 500 may be performed on packets within a same VLAN without regard to other VLANs, and the method 300 may be relied on to perform bandwidth analysis and allocation between VLANs.

The bandwidth use of a device, application, and/or data type may be measured 504 using a higher layer metric, such as an IP address, port number, a MAC address, information gathered from deep packet inspection, and/or the like. For example, packets may be classified based on an IP address and port number combination. Alternatively, or in addition, the particular transport layer protocol of each packet (e.g., Transmission Control Protocol ("TCP") or UDP) may be used to classify each packet. In an embodiment, bandwidth use may be determined for each of a plurality of classifications, and each classification may correspond with one or more devices, applications, and/or data types. The bandwidth use may be measured 504 over a predetermined period of time, by comparing the bandwidth to a predetermined rate (e.g., using tokens), and/or the like.

The portion of bandwidth to allocate to each device, application, and/or data type may be determined 506 based on the bandwidth use and/or an identity of the device, application, and/or data type. In some embodiments, the portion of bandwidth to allocate may be inherently determined 506 from one or more constraints (e.g., throughput, delay, packet loss, etc.) and/or priorities determined from the identity of the device, application, and/or data type. For example, delay may be minimized for real-time voice and video, and/or web browsing may have a higher priority than peer-to-peer traffic and/or bulk file transfers. Accordingly, voice and video may be perceived to be smooth, and web browsing may appear fast. The bulk file transfers and/or peer-to-peer traffic may use as much of the remaining bandwidth as possible to maximize transfer rate.

The total of the portions of bandwidth allocated to all devices, applications, and/or data types may be no more than the bandwidth allocated to the VLAN on which those devices, applications, and/or data types resides (e.g., a bandwidth allocated in step 308 of the method 300). In an embodiment, the bandwidth allocation to VLANs and bandwidth allocation to each device, application, and/or data type may be determined 506 cooperatively so a device, application, and/or data type may try to borrow from other VLANs. Alternatively, or in addition, rules for allocating bandwidth to VLANs and rules for allocating bandwidth to devices, applications, and/or data types may be evaluated together to determine 506 the portion of bandwidth to allocate.

Data packets may be scheduled 508 based on the measured bandwidth and/or the portion of bandwidth allocated to a device, application, and/or data type associated with the data packet being scheduled. As with step 506, scheduling 508 of data packets based on device, application, and/or data type may be performed cooperatively with the scheduling of data packets based on VLAN (e.g., the scheduling of step 310 in the method 300). Thus, if it is determined that a data packet should be delayed and/or dropped due to a VLAN using too much bandwidth, the scheduling at step 508 may determine which packet to delay and/or drop based on determined portion of bandwidth for each device, application, and/or data type. Scheduling 508 may include reordering packets based on the constraints and/or priorities from step 506, delaying packets, and/or dropping packets. For example, data requiring low delay and/or having a high priority may be moved ahead of data without such constraints and/or priority (e.g., a bulk file transfer). Applications may be configured to increase or decrease their bandwidth use based on the scheduling 508 of packets (e.g., bandwidth use may decrease if packets are dropped and/or delayed and may increase if they are not). The actual bandwidth use may adjust until it matches the portion determined 506. Although the measuring 504 bandwidth, determining 506 a portion of bandwidth to allocate, and scheduling 508 data packet steps are again illustrated as distinct steps, they may be combined in some embodiments. For example, a decision on scheduling 508 a data packet may be configured to inherently determine 506 an amount of bandwidth to allocate.

Figure 6:
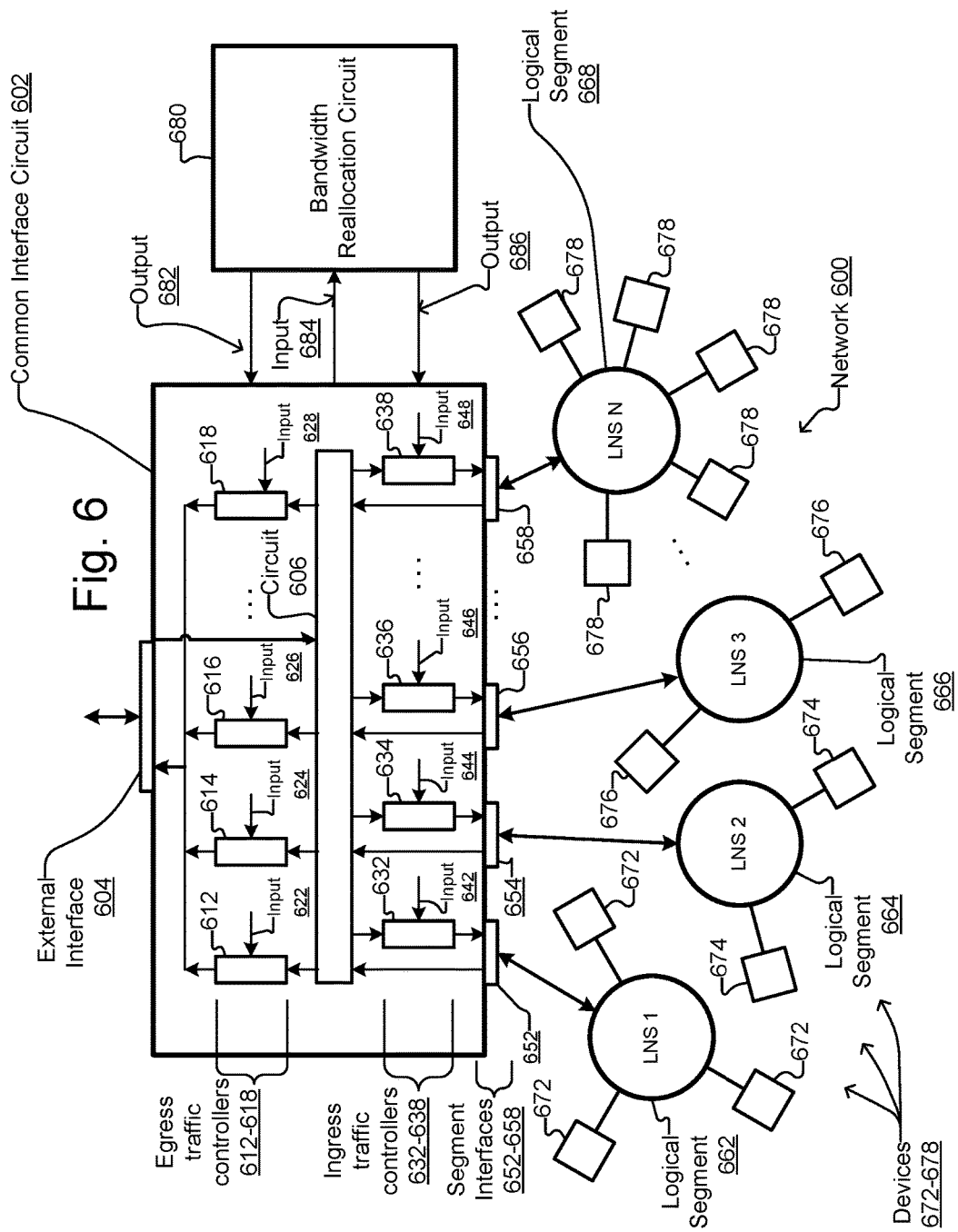
FIG. 6 illustrates an example of a segmented network, a common interface to the segmented network, and a bandwidth reallocation circuit.

FIG. 6 illustrates an example of a network 600 comprising N logical segments 662, 664, 666, 668. (Hereinafter, a logical segment of a network is sometimes referred to either as a "logical network segment" or an "LNS.") N can be any integer greater than or equal to two. A common interface circuit 602 can provide a common interface for the LNSs 662, 664, 666, 668 to entities external to the network 600. A bandwidth reallocation circuit 680 can monitor data traffic rates through the common interface circuit 602 to and/or from each LNS 662, 664, 666, 668. The bandwidth reallocation circuit 680 can also dynamically reallocate the total bandwidth capacity of the network 600 (hereinafter sometimes referred to as the "network bandwidth capacity") among the LNSs 662, 664, 666, 668 as the data traffic rates to and/or from the LNSs 662, 664, 666, 668 change. Thus, as some of the LNSs 662, 664, 666, 668 become busy with data traffic, network bandwidth can be temporarily borrowed for the busy LNSs 662, 664, 666, 668 from one or more of the LNSs 662, 664, 666, 668 that are less active with data traffic. This can result in more efficient use of the total network bandwidth than has been achieved in the prior art, which can significantly increase the speed at which data can be uploaded and/or downloaded to individual LNSs 662, 664, 666, 668.

As illustrated in FIG. 6, the network 600 can be segmented into N LNSs 662, 664, 666, 668. Four such LNSs 662, 664, 666, 668 are illustrated in FIG. 6, but there can be fewer or more. For example, the number N of LNSs 662, 664, 666, 668 can be an integer greater than or equal to two.

There can thus be between two and tens, hundreds, thousands, or more of such LNSs 662, 664, 666, 668. Each LNSs 662, 664, 666, 668 can have an identifier that uniquely distinguishes the LNS from all other LNSs of the network 600 but need not distinguish the LNS from any external entity (i.e., any device, system, or the like that is external to the network 600). Non-limiting examples of the network 600 include a local area network (LAN), a metropolitan area network (MAN), a wide area network (WAN), or the like. The network 600 can be a packet-switched network such as Ethernet, an abstraction based on physical Ethernet links, frame relay, or the like.

The common interface circuit 602 can comprise an external interface 604 to one or more external entities (e.g., systems, devices, or the like) that are external to the network 600. Non-limiting examples of such external entities include network routers (not shown), other networks (not shown), computing devices (not shown), communications devices (not shown), entertainment devices (not shown), gaming stations (not shown), "smart" appliances, or the like. The common interface circuit 602 can also comprise segment interfaces 652, 654, 656, 658 to the LNSs 662, 664, 666, 668. The common interface circuit 602 can thus provide interfaces between each of the LNSs 662, 664, 666, 668 and one or more external entities (not shown). There can be a segment interface 652, 654, 656, 658 for each LNS 662, 664, 666, 668 and a one-to-one correspondence between the segment interfaces 652, 654, 656, 658 and the LNSs 662, 664, 666, 668.

The segment interfaces 652, 654, 656, 658 can define the LNSs 662, 664, 666, 668. As shown, each LNS 662, 664, 666, 668 can comprise one or more interconnected devices 672, 674, 676, 678. The number of devices 672, 674, 676, 678 shown connected to each LNS 662, 664, 666, 668 in FIG. 6 is but an example. Any number from one to tens, hundreds, thousands, or more of such devices can be connected to an LNS 662, 664, 666, 668. Each of the devices 672, 674, 676, 678 can be any computing device, communications device, entertainment device, or the like. Non-limiting examples of the devices 672, 674, 676, 678 include computers such as a personal or laptop computer, a tablet, or the like; communications devices such as cellular, land-line telephones, or the like; entertainment devices such as televisions, gaming stations, or the like; or the like. The devices (e.g., 672) connected to the same LNS (e.g., 662) can be the same type of device or different devices.

An LNS 662, 664, 666, 668 can be defined by having all of its devices 672, 674, 676, 678 connected to the same segment interface 652, 654, 656, 658. For example, in FIG. 6, LNS 662 is depicted as comprising three devices 672, LNS 664 is depicted as comprising two devices 674, LNS 666 is depicted as comprising two devices 676, and LNS 668 is depicted as comprising five devices 678. (The foregoing numbers of devices 672, 674, 676, 678 is an example only, and there can be other numbers of devices connected to each LNS 662, 664, 666, 668.) LNS 662 can be defined by having all of its devices 672 connected to the same segment interface 652. LNSs 664, 666, 668 can be similarly defined as follows: LNS 664 by having all of its devices 674 connected to the same segment interface 654, LNS 666 by having all of its devices 676 connected to the same segment interface 656, and LNS 668 by having all of its devices 678 connected to the same segment interface 658 as illustrated in FIG. 6.

The segment interfaces 652, 654, 656, 658 can be physical and/or virtual. For example, each segment interface 652, 654, 656, 658 can be a physical port of a switching device such as a network switch (not shown but can be all or part of the common interface circuit 602). Alternatively, each segment interface 652, 654, 656, 658 can comprise a logical grouping of all or parts of multiple physical ports of such a switching device (not shown). As yet another example, one or more of the segment interfaces 652, 654, 656, 658 can be physical and others of the segment interfaces 652, 654, 656, 658 can be virtual.

In some embodiments, one or more of the LNSs 662, 664, 666, 668 can be a virtual LNS (VLNS). As used herein, a virtual logical network segment (VLAN) is one of a plurality of segments of a network that can be uniquely identified and distinguishes from every other segment of the network by an identifier (e.g., a tag) in datagrams destined for or originating from the network. An example of a VLNS is a virtual LAN (VLAN), which can be one of a plurality of such segments of a LAN.

As illustrated in FIG. 6, the common interface circuit 602 can also comprise a data traffic processing circuit 606, which can be connected to the external interface 604 and each of the segment interfaces 652, 654, 656, 658. If one or more of the segment interfaces 652, 654, 656, 658 is virtual, the virtual segment interface can be defined by the data traffic processing circuit 606. Regardless, the data traffic processing circuit 606 can receive outgoing data (any form of outgoing data is sometimes referred to herein as "egress" data) from any of the LNSs 662, 664, 666, 668; prepare the outgoing data for transmission; and send the outgoing data through the external interface 604 to one or more external entities (not shown). The data traffic processing circuit 606 can also receive through the external interface 606 from an external entity (not shown) incoming data (any form of incoming data is sometimes referred to herein as "ingress" data) that is addressed to one or more of the LNSs 662, 664, 666, 668. The data traffic processing circuit 606 can then process and send such incoming data through the corresponding segment interface 652, 654, 656, 658 to the addressed LNS 662, 664, 666, 668.

As also shown in FIG. 6, the common interface circuit 602 can include variable egress traffic controllers 612, 614, 616, 618 and/or variable ingress traffic controllers 632, 634, 636, 638. There can be a variable egress traffic controller 612, 614, 616, 618 for each LNS 662, 664, 666, 668 and a one-to-one correspondence between the variable egress traffic controllers 612, 614, 616, 618 and the LNSs 662, 664, 666, 668. There can likewise be a variable ingress traffic controller 632, 634, 636, 638 for each LNS 662, 664, 666, 668 and a one-to-one correspondence between the variable ingress traffic controllers 632, 634, 636, 638 and the LNSs 662, 664, 666, 668. Although illustrated in FIG. 6 as comprising both egress traffic controllers 612, 614, 616, 618 and ingress traffic controllers 632, 634, 636, 638, the common interface circuit 602 can instead have only egress traffic controllers 612, 614, 616, 618 or only ingress traffic controllers 632, 634, 636, 638.

Each variable egress traffic controller 612, 614, 616, 618 can comprise an egress control input 622, 624, 626, 628 for individually setting one or more parameters that control a rate at which data originating from its respective LNS 662, 664, 666, 668 is output through the external interface 604. Non-limiting examples of such parameters include a maximum bandwidth, a maximum burst rate, or the like allocated to each LNS 662, 664, 666, 668. Each variable egress traffic controller 612, 614, 616, 618 can do so, for example, by slowing the rate at which it provides egress data to the external interface 604, dropping and thus not providing some of the egress data to the external interface 604, or the like. In some embodiments, each egress traffic controller 612, 614, 616, 618 can be configured as a data queue operating in accordance with one or more traffic control algorithm such as a class based queueing (CBQ) algorithm, an intermediate queueing (IMQ) algorithm, a "leaky bucket" algorithm, or the like. One or more parameters of the traffic control algorithm can be independently set in each egress traffic controller 612, 614, 616, 618 via the egress control inputs 622, 624, 626, 628.

Similarly, each variable ingress traffic controller 632, 634, 636, 638 can comprise an ingress control input 642, 644, 646, 648 for individually setting one or more parameters that control the rate at which data for its respective LNS 662, 664, 666, 668 is provided to the LNS through the corresponding segment interface 652, 654, 656, 658. Non-limiting examples of such parameters include a maximum bandwidth, a maximum burst rate, or the like allocated to each LNS 662, 664, 666, 668. Each variable ingress traffic controller 632, 634, 636, 638 can do so, for example, by slowing the rate at which it provides ingress data destined for a particular LNS 662, 664, 666, 668 to the segment interface 652, 654, 656, 658 of the LNS, dropping and thus not providing a portion of the ingress data to the segment interface 652, 654, 656, 658, or the like. Like the egress traffic controllers 612, 614, 616, 618, in some embodiments, each ingress traffic controller 632, 634, 636, 638 can be configured as a data queue operating in accordance with one or more traffic control algorithms such those mentioned above. One or more parameters of the traffic control algorithm can be independently set in each ingress traffic controller 632, 634, 636, 638 via the ingress control inputs 642, 644, 646, 648.

The network 600 can have a substantially fixed maximum bandwidth capacity, which can be allocated among the LNSs 662, 664, 666, 668. For example, each of the egress traffic controllers 612, 614, 616, 618 and/or each of the ingress traffic controllers 632, 634, 636, 638 can be set via their respective control inputs 622, 624, 626, 628, 642, 644, 646, 648 to limit its corresponding LNS 662, 664, 666, 668 to a percentage of the network bandwidth capacity generally as discussed above.

The bandwidth reallocation circuit 680 can monitor data traffic to and/or from each of the LNSs 662, 664, 666, 668 during operation of the network 600. For example, the bandwidth reallocation circuit 680 can receive (e.g., continuously, periodically, or the like) input 684 from the data traffic processing circuit 606 that corresponds to a substantially instantaneous indication of the data passing through the data traffic processing circuit 606 addressed to and/or from each of the LNSs 662, 664, 666, 668. The bandwidth reallocation circuit 680 can determine (continuously, periodically, or the like) a new data rate for one or more (e.g., each) of the LNSs 662, 664, 666, 668. The bandwidth reallocation circuit 680 can then determine whether the data rate of one or more of the LNSs 662, 664, 666, 668 has changed sufficiently to warrant reallocating the network bandwidth capacity among the LNSs 662, 664, 666, 668. If so, the bandwidth reallocation circuit 680 can reallocate the network bandwidth capacity among the LNSs 662, 664, 666, 668 by, for example, providing outputs 682, 686 individually changing the settings of one or more of the control inputs 622, 624, 626, 628, 642, 644, 646, 648 to the egress traffic controllers 612, 614, 616, 618 and/or the ingress traffic controllers 632, 634, 636, 638 generally as discussed above. The bandwidth reallocation circuit 680 can repeatedly (e.g., continuously, periodically, or the like) do the foregoing and thus continuously, periodically, or the like dynamically reallocate the network bandwidth capacity among the LNSs 662, 664, 666, 668 as data traffic to and/or from each of the LNSs 662, 664, 666, 668 changes during operation of the network 600. Each time the bandwidth capacity of the network 600 is reallocated, however, the total bandwidth capacity allocated to the LNSs 662, 664, 666, 668 can remain fixed and equal to the bandwidth capacity of the network 600.

Figure 7:
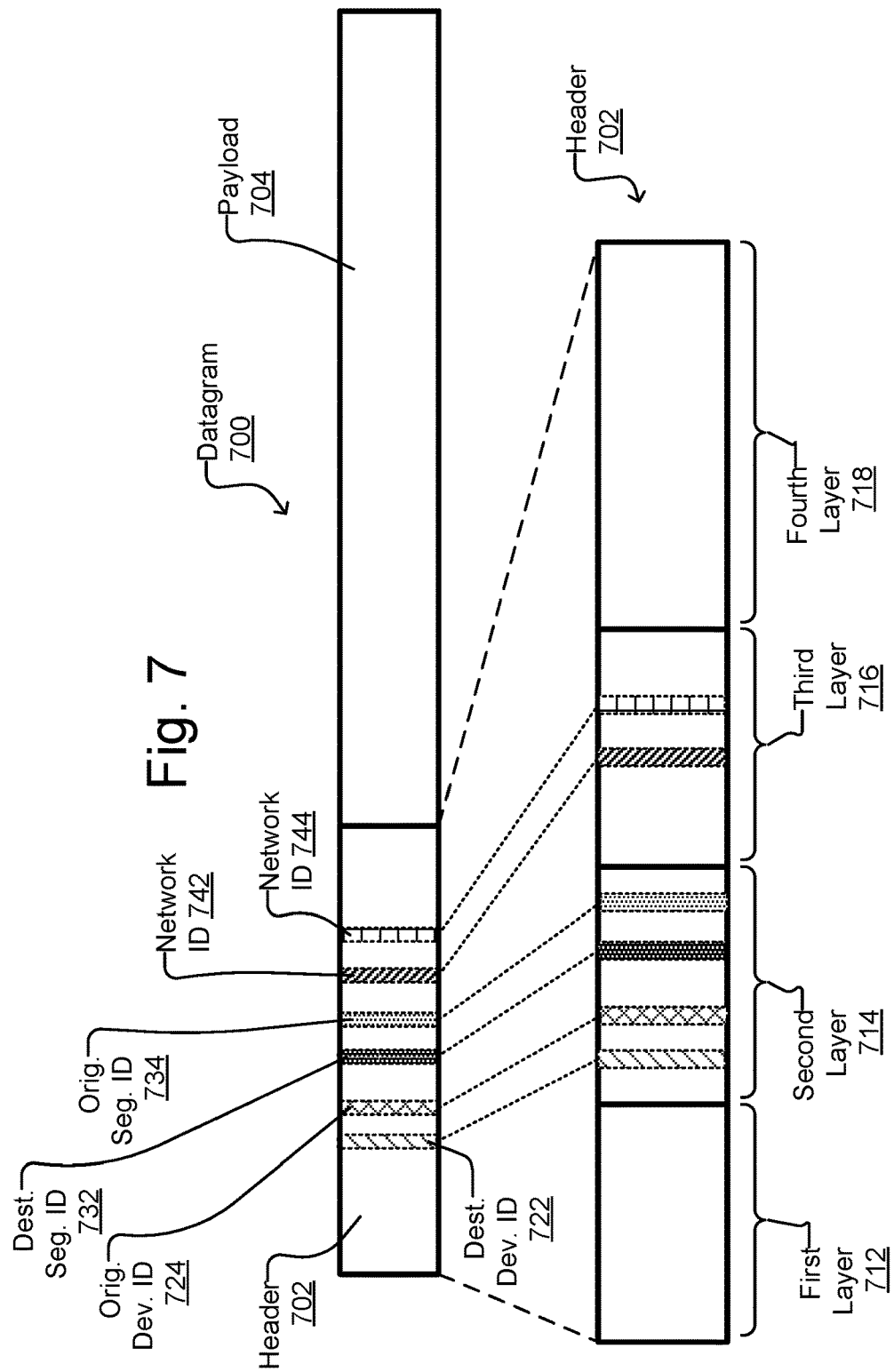
FIG. 7 is an example of a datagram.

In some embodiments, the network 600 can be configured to receive and transmit data in datagrams such as data packets. FIG. 7 illustrates an example of such a datagram 700.

As shown, a datagram 700 can comprise a header 702 and a payload 704. As is known in the field, the payload 704 can be the data being transferred in the datagram 700, and the header 702 can comprise information regarding the transfer. For example, as shown in FIG. 7, the header 702 can include, among other information, a destination network identifier (ID) 742 and an originating network ID 744; a destination segment ID 732 and an originating segment ID 734; and a destination device ID 722 and an originating device ID 724.

The network 600 and every external network to which the network 600 can send datagrams 700 or from which the network 600 can receive datagrams 700 can have a unique network ID. The destination network ID 742 thus uniquely identifies the network that is the intended destination of the datagram 700, and the originating network ID 744 uniquely identifies the network from which the datagram 700 originated. Similarly, every segment of the destination network can have a unique segment ID with respect to the other segments of the destination network to uniquely identify the segment of the destination network that is the intended recipient of the datagram 700. The destination segment ID 732 can thus uniquely identify the segment of the destination network that is the intended destination of the datagram 700. Likewise, every segment of the originating network can have a unique segment ID with respect to the other segments of the originating network to uniquely identify the segment of the originating network that sent the datagram 700, and the originating segment ID 732 can thus uniquely identify the segment of the originating network from which the datagram 700 originated. A datagram like 700 that includes one or more identifiers uniquely identifying an LNS of a network can be termed a "tagged" datagram.

The destination device ID 722 can similarly uniquely identify the device on the destination segment of the destination network that is the intended destination of the datagram 700. The originating device ID 724 can similarly uniquely identify the device on the originating segment of the originating network from which the datagram 700 originated. For example, every device on the destination segment of the destination network can have a unique device ID with respect to the other devices on the destination segment of the destination network, and every device on the originating segment of the originating network can likewise have a unique device ID with respect to the other devices on the originating segment of the originating network.

As shown in FIG. 7, in some embodiments, the header 702 can correspond to one or more of the seven layers of the open systems interconnection (OSI) standard for packetized data transfers. As is known, the first layer 712 (also known as the "physical layer") can comprise information regarding the physical transfer of the datagram 700. The second layer 714 (also known as the "data link layer") can comprise information regarding accessing the network 600. As shown, the second layer 714 can comprise the destination device ID 722, the originating device ID 724, the destination segment ID 732, and the originating segment ID 734 discussed above. The third layer 716 (also known as the "network layer") can comprise information for establishing an end-to-end connection between the network 600 and an external network. As shown, the third layer 716 can comprise the destination network ID 732 and the originating network 734 discussed above. As is known, layers 4-7 are also known, respectively, as the "transport layer," the "session layer," the "presentation layer," and the "application layer." The header 702 can also include information relative to those layers.

A distinction between third layer identifiers and second layer identifiers is as follows. A third layer identifier such as the network IDs 742, 744 uniquely identifies one network and distinguishes that network from other networks to which the identified network can communicate, for example, via network connecting devices such as routers, bridges, or the like. The destination network ID 742 thus uniquely identifies one network from all other networks with which the identified network can communicate. Similarly, the originating network ID 744 uniquely identifies one network from all other networks with which the identified network can communicate.

In contrast, a second layer identifier such as segment IDs 732, 734 and device IDs 722, 724 uniquely identifies one entity from all other entities on the network or a segment of the network identified in the third layer but does not uniquely identify that entity from other networks or entities on other networks. The destination segment ID 732 thus uniquely identifies a segment of the network identified by the network ID 742 from all other segments of the network identified by the network ID 742 but does not uniquely identify the segment from any other network or any segment of or device on another network. Similarly, the originating segment ID 734 uniquely identifies a segment of the network identified by the network ID 744 from all other segments of the network identified by the network ID 744 but does not uniquely identify the segment from any other network or any segment of or device on another network. Likewise, the destination device ID 722 uniquely identifies a device on the segment identified by the segment ID 732 from all other devices on the segment identified by the segment ID 732 but does not uniquely identify the device from any other network, segment, or device on another network or a segment of another network. The originating device ID 724 uniquely identifies a device on the segment identified by the segment ID 734 from all other devices on the segment identified by the segment ID 734 but does not uniquely identify the device from any other network, segment, or device on another network or a segment of another network.

Figure 9:
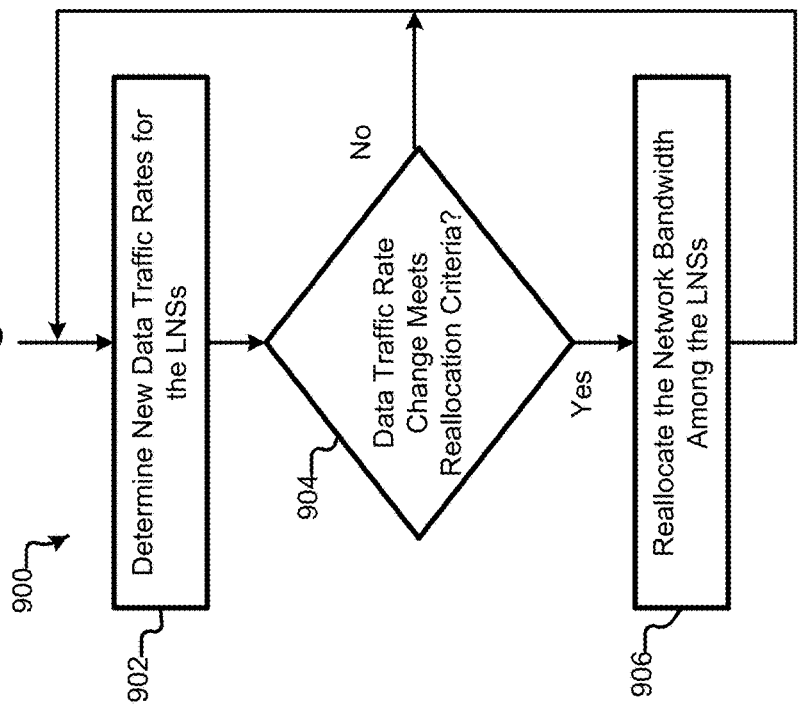
FIG. 9 illustrates a process that can be an example of operation of the bandwidth reallocation circuit of FIG. 6.

FIG. 8 illustrates an example of a process 800 for receiving and processing ingress datagrams destined for one or more of the LNSs 662, 664, 666, 668 and processing and sending egress datagrams originating from one of the LNSs 662, 664, 666, 668. Process 800 does the foregoing in accordance with a current allocation of the network bandwidth capacity among the LNSs 662, 664, 666, 668. Process 800 can represent operation of the network 600 and can be performed, for example, by the data traffic processing circuit 606. FIG. 9 is an example of a process 900 for monitoring the data traffic to and/or from each of the LNSs 662, 664, 666, 668 during performance of process 800 and dynamically reallocating the network bandwidth capacity among the LNSs 662, 664, 666, 668 as one or more of the monitored data traffic rates change. Process 900 can be performed, for example, by the bandwidth reallocation circuit 680 and substantially simultaneously with process 800. Thus, while the data traffic processing circuit 606 is performing process 800 to receive ingress datagrams and send egress datagrams in accordance with a current allocation of the network bandwidth capacity among the LNSs 652, 654, 666, 658, the bandwidth reallocation circuit 680 can monitor the data traffic to and/or from each of the LNSs 652, 654, 666, 658 and reallocate the network bandwidth capacity among the LNSs 652, 654, 666, 658 as the traffic rates change.

At step 802 of FIG. 8, an initial allocation of the network bandwidth capacity among the LNSs 662, 664, 666, 668 can be made. For example, the network bandwidth capacity can be allocated equally among the LNSs 662, 664, 666, 668. Regardless of how the network bandwidth capacity is allocated, step 802 can be performed by setting the control inputs 622, 624, 626, 628 of the egress traffic controllers 612, 614, 616, 618 and/or the control inputs 642, 644, 646, 648 of the ingress traffic controllers 632, 634, 636, 638 to effect the desired initial bandwidth allocation as discussed above. From step 802, process 800 can proceed to steps 804 and 810 and repeatedly perform steps 804-808 and steps 810-814 substantially in parallel.

At step 804, process 800 can receive through the external interface 604 ingress datagrams originating from external entities as discussed above. At step 806, process 800 can perform physical layer (e.g., layer 1 in the OSI model) processing on the ingress datagrams. At step 808, process 800 can provide the ingress datagrams to their respective destination LNSs 662, 664, 666, 668 in accordance with the currently set allocation of network bandwidth capacity.

Step 808 can be performed, for example, by identify the LNS or LNSs 662, 664, 666, 668 to which each ingress datagram is destined and providing the ingress datagram to the corresponding ingress traffic controller or controllers 632, 634, 636, 638. Each ingress traffic controller 632, 634, 636, 638 can then provide its ingress datagrams through its corresponding segment interface 652, 654, 666, 658 and thus the destination LNS 662, 664, 666, 668 in accordance with the current bandwidth allocation to the destination LNS 662, 664, 666, 668 generally as discussed above. For example, as discussed above, each ingress traffic controller 632, 634, 636, 638 can regulate the rate at which its ingress datagrams are provide to its segment interface 652, 654, 666, 658 so as not to exceed the portion of the network bandwidth capacity currently allocated to the LNS 662, 664, 666, 668 of the ingress traffic controller 632, 634, 636, 638.

At step 810, process 800 can receive through the segment interfaces 652, 654, 666, 658 egress datagrams originating from the LNSs 662, 664, 666, 668 as discussed above. At step 812, process 800 can perform physical layer (e.g., layer 1 in the OSI model) processing on the ingress datagrams. At step 814, process 800 can provide the egress datagrams to the external interface 604 in accordance with the currently set bandwidth allocation to the LNS 662, 664, 666, 668 from which the egress datagrams originated.

Step 814 can be performed, for example, by providing each egress datagram to the egress traffic controller 612, 614, 616, 618 corresponding to the LNS 662, 664, 666, 668 from which the egress datagram originated. Each egress traffic controller 612, 614, 616, 618 can then provide its egress datagrams to the external interface 604 in accordance with the current bandwidth allocation of the originating LNS 662, 664, 666, 668 generally as discussed above. For example, as discussed above, each egress traffic controller 612, 614, 616, 618 can regulate the rate at which its egress datagrams are provide to the external interface 604 so as not to exceed the portion of the network bandwidth capacity currently allocated to the originating LNS 662, 664, 666, 668.

Process 800 can thus set an initial allocation of the bandwidth of the network 800 among the LNSs 662, 664, 666, 668. Process 800 can then simultaneously receive ingress datagrams destined for and send egress datagrams originating from the LNSs 662, 664, 666, 668 in accordance with the current bandwidth allocation. As mentioned, while process 800 is operating, process 900 can monitor data traffic rates to and/or from each of the LNSs 662, 664, 666, 668 and reallocate the bandwidth of the network 800 among the LNSs 662, 664, 666, 668.

Figure 10:
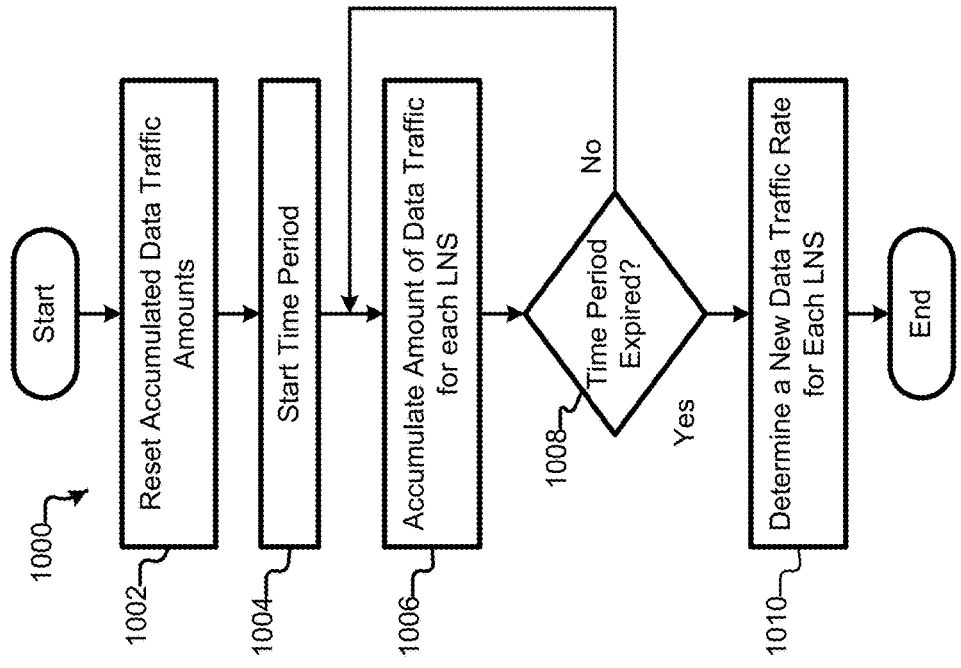
FIG. 10 is an example of a process for performing the step of determining new data traffic rates of FIG. 9.

At step 902, process 900 can determine a new data traffic rate for each LNS 662, 664, 666, 668. FIG. 10 illustrates an example of a process 1000 for performing step 902.

At step 1002, process 1000 can reset any previously accumulated data traffic amount for the LNSs 662, 664, 666, 668. At step 1004, process 1000 can start a new time period. As shown by steps 1006 and 1008, process 1000 can then accumulate a measure of the amount of data traffic to and/or from each LNS 662, 664, 666, 668 over a given time period. When the time period indicated by step 1008 expires, process 1000 can, at step 1010, determine a new traffic rate for each of the LNSs 662, 664, 666, 668. For example, process 1000 can divide the amount of data traffic accumulated at step 1006 for each LNS 662, 664, 666, 668 by the time period. Process 1000 can determine at step 1006 an amount of data traffic for each LNS 662, 664, 666, 668 in any of a number of different ways.

As a first example, at step 1006, process 1000 can count or estimate the number of egress datagrams received at the data traffic processing circuit 606 from each LNS 662, 664, 666, 668 during the time period (see step 1008). For example, process 1000 can count every $n^{th}$ one of the egress datagrams received for processing by the data traffic processing circuit 606 from each LNS 662, 664, 666, 668, where n can be any positive integer including one. For example, n can be an integer that is greater than or equal to two, five, ten, twenty, or fifty. As another example, n can be an integer that is less than or equal to five hundred, less than or equal to one hundred, or less than or equal to fifty. As other examples, n can be an integer between two (2) and five hundred (500) inclusive, between five (5) and one hundred (100) inclusive, or between five (5) and fifty inclusive (50). The foregoing values and ranges are examples only and are not limiting. As another example, n can be one, in which case process 1000 counts at step 1006 every egress datagram received at the data traffic processing circuit 606 from each LNS 662, 664, 666, 668 during a time period defined by step 1008.

Thus, while the data traffic processing circuit 606 performs process 800 of FIG. 8, receiving at step 810 egress datagrams from the LNSs 662, 664, 666, 668, the process 1000 of FIG. 10 can count for each LNS 662, 664, 666, 668 every $n^{th}$ one of the egress datagrams received by the data traffic processing circuit 606 at step 810 of process 800. The egress datagrams can be counted before or after performing the physical layer processing of step 812 of FIG. 8. The originating LNS 662, 664, 666, 668 of each egress datagram can be determined, for example, by the originating segment ID 734 (see FIG. 7) in its header 702. Alternatively, the originating LNS 662, 664, 666, 668 of each egress datagram can be determined in other ways such as the segment interface 652, 654, 666, 658 from which it was received.

A second example of determining at step 1006 an amount of data traffic for each LNS 652, 654, 666, 658 is to calculate or estimate the amount of data in egress datagrams received at the data traffic processing circuit 606 from each LNS 662, 664, 666, 668 during the time period (see step 1008). This can be accomplished by determining the size of every $n^{th}$ one of the egress datagrams received for processing by the data traffic processing circuit 606 from each LNS 662, 664, 666, 668, where n can be any of the integer values discussed above. The amount of data corresponding to each LNS 662, 664, 666, 668 can thus be an accumulated sum of the sizes of all of every egress datagram from the LNS 662, 664, 666, 668. The originating LNS 662, 664, 666, 668 of each egress datagram can be determined as discussed above. The size of each such egress datagram can be determined (e.g., estimated) in any of a number of ways. For example, the header 702 (see FIG. 7) of the datagram can include a field indicating the size of the payload 704, which can be equated with the size of the datagram. As another example, the header 702 can comprise a field indicating whether the payload 704 is the maximum allowed size. Such an indication and the amount of data corresponding to the maximum allowed size of the payload 704 can be used to determine the amount of data in each egress datagram.

A third example of determining at step 1006 an amount of data traffic for each LNS 652, 654, 666, 658 is to calculate or estimate the amount of data in ingress datagrams received at the data traffic processing circuit 606 through the external interface 604 that are destined for each LNS 662, 664, 666, 668 during the time period (see step 1008). Similar to the first example discussed above, process 1000 can count every $n^{th}$ one of the ingress datagrams received for processing by the data traffic processing circuit 606 that is destined for one of the LNSs 662, 664, 666, 668, where n can be any integer value discussed above. Thus, while the data traffic processing circuit 606 performs process 800 of FIG. 8, receiving at step 804 ingress datagrams destined for the LNSs 662, 664, 666, 668, the process 1000 of FIG. 10 can count for each LNS 662, 664, 666, 668 every $n^{th}$ one of the ingress datagrams received by the data traffic processing circuit 606 at step 804 of process 800. The ingress datagrams can be counted before or after performing the physical layer processing of step 806 of FIG. 8. The destination LNS 662, 664, 666, 668 of each ingress datagram can be determined, for example, by the destination segment ID 732 (see FIG. 7) in its header 702.

A fourth example of determining at step 1006 an amount of data traffic for each LNS 652, 654, 666, 658 is similar to the second example discussed above but determines an amount of data in ingress datagrams rather than egress datagrams. That is, the amount of data traffic for each LNS 662, 664, 666, 668 can be determined at step 1006 by calculating or estimating the amount of data in ingress datagrams received at the data traffic processing circuit 606 and destined for one of the LNSs 662, 664, 666, 668 during the time period (see step 1008). This can be accomplished by determining the size of every $n^{th}$ one of the ingress datagrams received for processing by the data traffic processing circuit 606 and destined for one of the LNSs 662, 664, 666, 668, where n can be any of the integer values discussed above. The amount of data corresponding to each LNS 662, 664, 666, 668 can thus be an accumulated sum of the sizes every $n^{th}$ one of the ingress datagrams destined for one of the LNSs 662, 664, 666, 668.

A fifth example of performing step 1006 can be a combination of the first and third examples discussed above. That is, process 1000 can count or estimate the number of egress data grams received at the data traffic processing circuit 606 from each LNS 662, 664, 666, 668 and the number of ingress datagrams received at the data traffic processing circuit 606 through the external interface 604 that are destined for the LNS 662, 664, 666, 668 during the time period (see step 1008). The foregoing counts can be determined in any manner discussed above. An amount of data traffic for each LNS 652, 654, 666, 658 determined at step 1006 can be a sum or a weighted sum of the egress datagrams from and the ingress datagrams to the LNS 662, 664, 666, 668 662.

A sixth example of performing step 1006 can be a combination of the second and fourth examples discussed above. That is, process 1000 can calculate or estimate an amount of data in egress datagrams received at the data traffic processing circuit 606 from each LNS 662, 664, 666, 668 and an amount of data in ingress datagrams received at the data traffic processing circuit 606 through the external interface 604 that are destined for the LNS 662, 664, 666, 668 during the time period (see step 1008). The foregoing calculated or estimated amounts of data can be determined in any manner discussed above. An amount of data traffic for each LNS 652, 654, 666, 658 determined at step 1006 can be a sum or a weighted sum of the amounts of data in the egress datagrams from and the ingress datagrams to the LNS 662, 664, 666, 668 662.

Returning to process 900 of FIG. 9, after determining new data traffic rates for each LNS 662, 664, 666, 668 at step 902, process 900 can, at step 904, determine whether the new data traffic rates meet one or more reallocation criteria. Process 900 can determine whether the new traffic rates determined at step 902 meet one or more reallocation criteria by comparing a representation of the new traffic rate for each LNS 662, 664, 666, 668 to a representation of past traffic rates for each corresponding LNS 662, 664, 666, 668. For example, process 900 can determine at step 904 that a reallocation criteria is meet if a difference between the representation of the new traffic rate and the representation of the past traffic rates of at least m of the LNSs 662, 664, 666, 668 exceeds a threshold difference, where m is an integer between one and N inclusive. (As noted above, N is the number of LNSs 662, 664, 666, 668.) The threshold difference can be a percentage difference or change, a change in the difference or values of the traffic rates, or the like. Examples of the threshold difference include the representation of the new data traffic rate of at least one of the LNSs 662, 664, 666, 668 being at least five percent, at least ten percent, at least twenty percent, at least thirty percent, at least forty percent, or at least fifty percent faster or slower than the representation of past values of the data traffic rate of the at least one LNS 662, 664, 666, 668. The foregoing percentage values are examples only and are not limiting.

The representation of the new traffic rate for each LNS 662, 664, 666, 668 can be determined in any number of ways. For example, the representation of the new data traffic rate for each LNS 662, 664, 666, 668 can be the new value of the data traffic rate for the LNS as determined at the most recent performance of step 902 of process 900. As another example, the representation of the new traffic rate for each LNS 662, 664, 666, 668 can be an average or weighted average of the new value of the data traffic rate for the LNS as determined at the most recent performance of step 902 of process 900 and x past values of the data traffic rate for the LNS as determined at x past performances of step 902 of process 900, where x is an integer greater than or equal to one. For example, x can be between one and fifty (inclusive), between five and one hundred (inclusive), or the like. As yet another example, the representation of the new traffic rate for each LNS 662, 664, 666, 668 can be a predicted future value of the data traffic rate for each LNS as determined from the new value of the data traffic rate of the LNS as determined at the most receive performance of step 902 of process 900 and one or more past values of the data traffic rate of the LNS. The predicted value can be determined by extrapolation, predictive filtering algorithms such as Kalman or Bayesian predictive filtering algorithms, or the like.

The representation of past traffic rates for each LNS 662, 664, 666, 668 can also be determined in any number of ways. For example, the representation of past traffic rates for an LNS 662, 664, 666, 668 can be a past value of the data traffic rate for the LNS as determined at a previous performance of step 902 of process 900. As another example, the representation of the past traffic rates for each LNS 662, 664, 666, 668 can be an average or weighted average of y past values of the data traffic rate for the LNS as determined at y past performances of step 902 of process 900, where x is an integer greater than or equal to one. For example, y can be between one and fifty (inclusive), between five and one hundred (inclusive), or the like.

If process 900 determines at step 904 that the new data traffic rates do not meet a reallocation criteria, process 900 can return to step 902 and again calculate new data traffic rates for each of the LNSs 662, 664, 666, 668. Otherwise, process 900 proceeds to step 906, wherein process 900 reallocates the network 600 bandwidth among the LNSs 662, 664, 666, 668.

As discussed above, process 900 can change the portion of the network bandwidth allocated to one or more of the LNSs 662, 664, 666, 668 by providing new control values to the egress control inputs 622, 624, 626, 628 of the egress traffic controllers 612, 614, 616, 618 and/or new control values to the ingress control inputs 642, 644, 646, 648 of the egress traffic controllers 632, 634, 636, 638 of the LNSs 662, 664, 666, 668 generally as discussed above. For example, the bandwidth reallocation circuit 680 performing process 900 can provide new control values to the egress control inputs 622, 624, 626, 628 via the output 682 and/or new control values to the ingress control inputs 642, 644, 646, 648 via the output 686.

As also discussed above, the portion of the network bandwidth capacity allocated to an LNS 662, 664, 666, 668 can be provided as a maximum bandwidth limit that the LNS 662, 664, 666, 668 can utilize. In some embodiments, a sum of the maximum bandwidth limits allocated to the LNSs 662, 664, 666, 668 can be less than, substantially equal to, or equal to the network bandwidth capacity each time a new reallocation of the network bandwidth capacity is made at step 906. Nevertheless, process 900 can determine as part of step 906 the maximum bandwidth limit for each LNS 662, 664, 666, 668 in any number of ways.

For example, process 900, as part of step 906, can apportion the network bandwidth capacity among the LNSs 662, 664, 666, 668 in accordance with one or more of the traffic rate changes detected as part of step 904. As another example, process 900 can apportion the network bandwidth capacity among the LNSs 662, 664, 666, 668 in direct or weighted proportion to the new data traffic rates or a representation of the new data traffic rates of the LNSs 662, 664, 666, 668 as determined as part of the most recent performance of step 902. As another example, process 900 can apportion the network bandwidth capacity among the LNSs 662, 664, 666, 668 in accordance with a network scheduling algorithm such as a class based queueing (CBQ) algorithm and/or an intermediate queuing (IMQ) algorithm such as are known in the field. One or more of the new data traffic rates or representations of the new data traffic rates determined as part of the most recent performance of step 902 can be among the inputs to such network scheduling algorithms.

Although specific embodiments and applications of the invention have been described in this specification, these embodiments and applications are exemplary only, and many variations are possible.

We claim:

1. A process, implemented by a common interface circuit that includes an external interface by which the common interface circuit connects to an external network and a plurality of segment interfaces by which logical network segments (LNSs) connect to the common interface circuit, of dynamically allocating a bandwidth capacity of the external interface among the LNSs of the network, the process comprising:
   providing an initial allocation of bandwidth to each of the LNSs from the bandwidth capacity of the external interface;
   monitoring datagrams that are transmitted to and/or from the LNSs via the external interface, the monitoring including examining a layer 2 header of the datagrams to determine to which LNS each monitored datagram pertains;
   based on the monitoring, determining that each of one or more LNSs is currently consuming an amount of bandwidth in excess of the initial allocation of bandwidth to the LNS;
   determining that the LNSs are not currently consuming the bandwidth capacity of the external interface; and
   providing an updated allocation of bandwidth by increasing the bandwidth allocated to each of the one or more LNSs.

2. The process of claim 1, wherein examining the layer 2 header comprises one of:
   identifying a source MAC address when the datagram is transmitted from one of the LNSs; or
   identifying a destination MAC address when the datagram is transmitted to one of the LNSs.

3. The process of claim 1, wherein examining the layer 2 header comprises identifying a VLAN tag in the layer 2 header.

4. The process of claim 1, wherein determining that the LNSs are not currently consuming the bandwidth capacity of the external interface comprises determining that one or more other LNSs are currently consuming an amount of bandwidth less than the initial allocation of bandwidth to each of the one or more other LNSs, the method further comprising:
   based on the monitoring, and after providing the updated allocation of bandwidth, determining that the one or more other LNSs are consuming an increased amount of bandwidth; and
   providing another updated allocation of bandwidth by decreasing the bandwidth allocated to each of the one or more LNSs.

5. The process of claim 1, further comprising:
   based on the monitoring, determining that a subset of the LNSs are currently consuming bandwidth, the subset including the one or more LNSs; and
   wherein providing an updated allocation of bandwidth comprises allocating the bandwidth capacity among the subset of the LNSs such that the subset of the LNSs can consume the full bandwidth capacity.

6. The process of claim 4, wherein determining that one or more other LNSs are currently consuming an amount of bandwidth less than the initial allocation of bandwidth to each of the one or more other LNSs comprises determining that the one or more other LNSs are not currently consuming any bandwidth, and wherein determining that the one or more other LNSs are consuming an increased amount of bandwidth comprises determining that the one or more other LNSs have resumed consuming bandwidth.

7. The process of claim 1, wherein providing an initial allocation of bandwidth to each of the LNSs comprises implementing a queue for each of the LNSs, each queue being configured to pass through datagrams pertaining to the corresponding LNS in accordance with the initial allocation of bandwidth, wherein each datagram is placed in the corresponding queue based on the layer 2 header of the datagram.

8. The process of claim 1, wherein the segments interfaces are virtual interfaces such that each of the LNSs connect to the common interface circuit via the same physical port.

9. A device comprising:
   an external interface through which a bandwidth capacity is provided, the external interface connecting the device to an external network;
   a common interface by which a plurality of logical network segments (LNSs) are coupled to the device; and
   a bandwidth reallocation circuit that is configured to allocate the bandwidth capacity provided through the external interface among the plurality of logical network segments, characterized in that the bandwidth reallocation circuit is configured to perform the following process to dynamically allocate the bandwidth capacity of the external interface among the LNSs of the network:
   provide an initial allocation of bandwidth to each of the LNSs from the bandwidth capacity of the external interface;
   monitor datagrams that are transmitted to and/or from the LNSs via the external interface, the monitoring including examining a layer 2 header of the datagrams to determine to which LNS each monitored datagram pertains;
   based on the monitoring, determine that each of one or more LNSs is currently consuming an amount of bandwidth in excess of the initial allocation of bandwidth to the LNS,
   determine that the LNSs are not currently consuming the bandwidth capacity of the external interface; and
   provide an updated allocation of bandwidth by increasing the bandwidth allocated to each of the one of more LNSs.

10. The device of claim 9, wherein, when the bandwidth reallocation circuit determines that a subset of the LNSs are currently consuming bandwidth, the bandwidth reallocation circuit updates the allocation of the bandwidth capacity to allow the subset of the LNSs to consume the bandwidth capacity, the subset including less than all the LNSs.

11. The device of claim 9, wherein determining that the LNSs are not currently consuming the bandwidth capacity comprises determining that one or more other LNSs are currently consuming an amount of bandwidth less than a current allocation of bandwidth to each of the one or more other LNSs, wherein the bandwidth reallocation circuit is further configured to determine, after providing the updated allocation of bandwidth, that the one or more other LNSs are consuming an increased amount of bandwidth and provide another updated allocation of bandwidth by decreasing the bandwidth allocated to each of the one or more LNSs.

12. The device of claim 9, wherein the bandwidth reallocation circuit periodically performs the examination and the update.

13. The device of claim 9, wherein examining layer 2 headers of datagrams comprises:
 identifying a source MAC address when the datagram is sent from a LNS; or
 identifying a destination MAC address when the datagram is sent to a LNS.

14. The device of claim 9, wherein examining layer 2 headers of datagrams comprises:
 identifying a VLAN tag.

15. The device of claim 9, wherein the bandwidth reallocation circuit comprises a queue for each of the LNSs, each queue being configured to control a rate at which datagrams pertaining to the corresponding LNS are passed through the device.

16. One or more non-transitory computer storage media storing computer executable instructions which, when executed on a common interface circuit that includes an external interface by which the common interface circuit connects to an external network and a plurality of segment interfaces by which logical network segments (LNSs) connect to the common interface circuit, implement a process of dynamically allocating a bandwidth capacity of the external interface among the LNSs of the network, the process comprising:
 providing an initial allocation of bandwidth to each of the LNSs from the bandwidth capacity of the external interface;
 monitoring datagrams that are transmitted to and/or from the LNSs via the external interface, the monitoring including examining a layer 2 header of the datagrams to determine to which LNS each monitored datagram pertains;
 based on the monitoring, determining that each of one or more LNSs is currently consuming an amount of bandwidth in excess of the initial allocation of bandwidth to the LNS;
 determining that the LNSs are not currently consuming the bandwidth capacity of the external interface; and
 providing an updated allocation of bandwidth by increasing the bandwidth allocated to each of the one or more LNSs.

17. The computer storage media of claim 16, wherein examining the layer 2 header comprises one of:
 identifying a source MAC address when the datagram is transmitted from one of the LNSs; or
 identifying a destination MAC address when the datagram is transmitted to one of the LNSs.

18. The computer storage media of claim 16, wherein examining the layer 2 header comprises identifying a VLAN tag in the layer 2 header.

19. The computer storage media of claim 16, wherein determining that the LNSs are not currently consuming the bandwidth capacity of the external interface comprises determining that one or more other LNSs are currently consuming an amount of bandwidth less than the initial allocation of bandwidth to each of the one or more other LNSs, the process further comprising:
 based on the monitoring, and after providing the updated allocation of bandwidth, determining that the one or more other LNSs are consuming an increased amount of bandwidth; and
 providing another updated allocation of bandwidth by decreasing the bandwidth allocated to each of the one or more LNSs.

20. The computer storage media of claim 16, wherein the process further comprises:
 based on the monitoring, determining that a subset of the LNSs are currently consuming bandwidth, the subset including the one or more LNSs; and
 wherein providing an updated allocation of bandwidth comprises allocating the bandwidth capacity among the subset of the LNSs such that the subset of the LNSs can consume the full bandwidth capacity.

\* \* \* \* \*